(No Model.)
H. L. MOYER & G. W. YOULLS.
ROLLER JOURNAL FOR CAR AXLES.
No. 377,836. Patented Feb. 14, 1888.
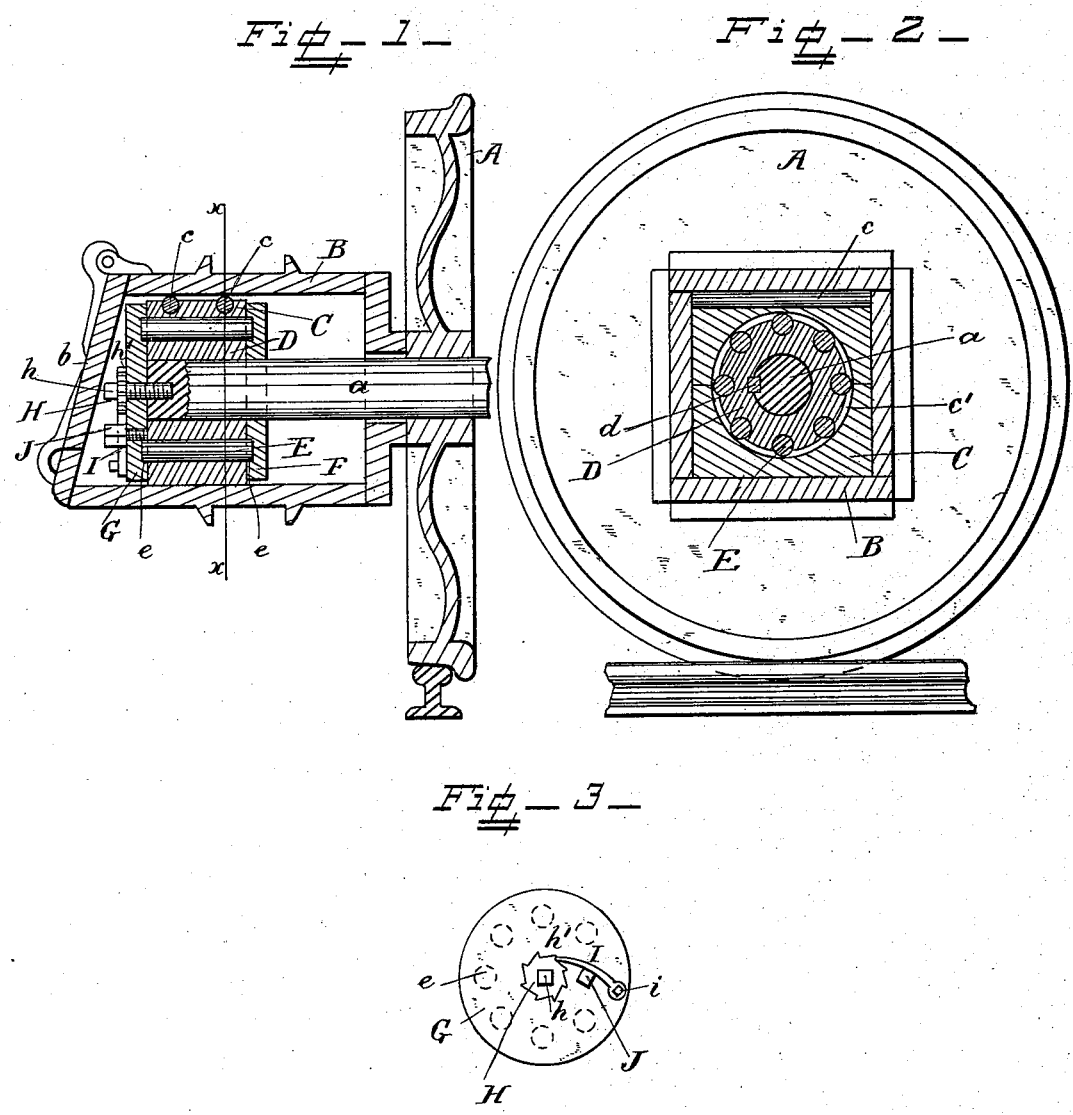

UNITED STATES PATENT OFFICE.

HENRY L. MOYER AND GEORGE W. YOULLS, OF SHICKSHINNY, PENNSYLVANIA.

ROLLER-JOURNAL FOR CAR-AXLES.

SPECIFICATION forming part of Letters Patent No. 377,836, dated February 14, 1888.

Application filed September 13, 1887. Serial No. 249,593. (No model.)

*To all whom it may concern:*

Be it known that we, HENRY L. MOYER and GEORGE W. YOULLS, citizens of the United States, residing at Shickshinny, in the county of Luzerne and State of Pennsylvania, have invented certain new and useful Improvements in Roller-Journals for Car-Axles; and we do hereby declare the following to be a full, clear, and exact description of the invention, such as will enable others skilled in the art to which it appertains to make and use the same.

This invention relates to roller-journals for car-axles; and it consists in the novel construction and combination of the parts, hereinafter fully described and claimed, whereby the friction is very greatly reduced.

In the drawings, Figure 1 is a longitudinal vertical section through the journal. Fig. 2 is a cross-section through the same, taken on line $x\ x$ in Fig. 1. Fig. 3 is an end view of the outer disk of the bearing-block.

A is a car-wheel, and $a$ is its axle.

B is the axle-box, of ordinary construction, and provided with the hinged lid $b$, for filling the lower part of it with oil.

C is the pedestal, sliding within the said axle-box and provided with two oscillating rollers, $c$, at the top to prevent jars when the car strikes against any object. A circular cavity or bearing, $c'$, is formed in the pedestal concentric with the axle.

D is the axle-block, secured upon the axle by the key $d$, and E are anti-friction rollers journaled in equidistant recesses in the circumference of the block and rolling against the surface of the bearing $c'$. The ends of the rollers project slightly beyond the block and are received in the circular recesses $e$ of the disks F and G, which bear against the ends of the pedestal around the bearing. To admit of the examination of the rollers E, the outer disk, G, is removably connected to the axle by the screw-bolt H, having the square head $h$, for turning it, and the ratchet $h'$, which prevents it from turning back.

I is a spring-pawl secured to the disk G by the square rivet $i$ and engaging with the said ratchet, and J is a square-headed stud-bolt which disconnects the spring from the ratchet when turned.

What we claim is—

1. The combination of the axle, the axle-block secured thereupon, the anti-friction rollers carried in recesses in said block, the pedestal having a circular bearing-cavity for said rollers, the disks secured to the axle against the ends of the pedestal and having circular recesses for the ends of the rollers, and the screw-bolt for removably securing the outer disk to the axle, substantially as set forth.

2. The combination of the axle, the axle-block secured to the axle, the anti-friction rollers carried in recesses in said block, the pedestal having a circular bearing-cavity for said rollers, the disks secured to the axle against the ends of the pedestal and having circular recesses for the ends of the rollers, the screw-bolt for removably securing the outer disk to the axle and provided with the ratchet at its head, the spring-pawl engaging with said ratchet, and the square-headed stud-bolt for disengaging said pawl when desired, substantially as and for the purpose set forth.

H. L. MOYER.
       GEO. W. YOULLS.

Witnesses:
 G. W. FINK,
 O. E. MYERS.